(12) United States Patent
Kikugawa

(10) Patent No.: US 8,588,048 B2
(45) Date of Patent: Nov. 19, 2013

(54) OPTICAL INFORMATION RECORDING MEDIUM, OPTICAL INFORMATION RECORDING AND REPRODUCING DEVICE, AND RECORDING METHOD

(71) Applicant: Hitachi Consumer Electronics Co., Ltd., Tokyo (JP)

(72) Inventor: Atsushi Kikugawa, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/686,094

(22) Filed: Nov. 27, 2012

(65) Prior Publication Data

US 2013/0135976 A1      May 30, 2013

(30) Foreign Application Priority Data

Nov. 29, 2011   (JP) .................................. 2011-260406

(51) Int. Cl.
*G11B 7/00*   (2006.01)
(52) U.S. Cl.
USPC ..................................... 369/275.3; 369/44.28
(58) Field of Classification Search
USPC ............ 369/47.1, 47.17, 47.28, 44.13, 275.2, 369/275.3, 13.54, 13.35, 275.4, 44.26, 369/44.27, 44.28, 94, 47.27
See application file for complete search history.

(56) References Cited

U.S. PATENT DOCUMENTS 5,491,678 A      2/1996   Maeda et al.
6,965,545 B2 *   11/2005  Hino et al. .................. 369/13.54
7,224,650 B2 *   5/2007   Hino et al. .................. 369/47.14
2009/0245048 A1 10/2009  Ueda et al.
2012/0134247 A1 5/2012   Kikugawa et al.

FOREIGN PATENT DOCUMENTS

JP      7-110958     4/1995
JP      2008-97723   4/2008
JP      2009-238285  10/2009

OTHER PUBLICATIONS

Masakazu Ogasawara et al., 16 layers Write Once Disc with a Separated Guide Layer, TH-L-07, Research & Development Division, Pioneer Corporation and SQ Research Center, TDK Corporation. E-mail: masakazu_ogasawara@post.pioneer.co.jp.
Hirotaka Miyamoto et al., Direct Servo Error Signal Detection Method from Recorded Micro-Reflectors, Japanese Journal of Applied Physics48 (2009) 03A054.

* cited by examiner

*Primary Examiner* — Nabil Hindi
(74) *Attorney, Agent, or Firm* — Antonelli, Terry, Stout & Kraus, LLP.

(57) ABSTRACT

To carry out a track control by compensating for an offset caused by a radial tilt when a track control of a main beam is carried out by detecting tracking information provided at a reference layer of a spatial recording medium by a guide beam, there are formed a first mark pair row aligned with the first mark pairs in a radius direction by a track pitch, and other mark pair row aligned with the second mark pairs in the radius direction by the track pitch. The other mark pair row is arranged in the radius direction by being shifted from the first mark pair row by a prescribed distance. The track control is made to be able to carry out by dispensing with an uncontrollable region by selecting one of plural track error signals generated from the plural mark pairs.

6 Claims, 13 Drawing Sheets

# OPTICAL INFORMATION RECORDING MEDIUM, OPTICAL INFORMATION RECORDING AND REPRODUCING DEVICE, AND RECORDING METHOD

CLAIM OF PRIORITY

The present application claims priority from Japanese patent application JP 2011-260406 filed on Nov. 29, 2011, the content of which is hereby incorporated by reference into this application.

FIELD OF THE INVENTION

The present invention relates to an optical information recording and reproducing system which carries out a track control by using a reference layer.

BACKGROUND OF THE INVENTION

In the following, portions of technical terms in an explanation are based on what are used in a Blu-ray Disc (BD). However, an application range of the present invention is not limited to BD.

An enlargement of a recording capacity of an optical disc have been realized by forming a short wavelength of a light source, increasing a numerical aperture (NA) of an objective lens, and increasing a number of recording layers per disc in addition thereto. BD realizes a recording capacity of 50 GB by two layers by using a blue semiconductor laser and a high NA objective lens with NA of 0.85. In 2010, BDXL having a recording capacity equal to or more than 100 GB was reduced into practice by increasing a number of recording layers to 3 or 4 and at the same time, also increasing an areal recording density.

Shortening of a recording wavelength and an increasing NA of objective lens are near to limits and in the future, it is not easy to considerably increase an areal recording density. Therefore, it is one of promising resolving means to further increase a number of recording layers in order to realize a recording capacity more than the above-described.

However, when a number of recording layers is going to be increased by a configuration similar to that of a multilayered optical disc of a background art, there is a high possibility that a reduction in cost per a recording capacity is difficult to be realized. That is because fabrication cost and yield of a current multilayered optical disc exclusively relate to a process of forming a recording layer. More specifically, an increase in a number of layers is directly linked to an increase in a number of steps, and a final yield is generally determined by a yield in stamping per one layer raised to the power of the number of layers.

Hence, there is investigated a system dispensing with stamping when a recording layer is formed as described in ISOM10 Technical Abstract, Th-L-07, "16 Layers Write Once Disc with a Separated Guide Layer". The system is featured in that a layer that is formed with a groove used for tracking (hereinafter, referred to as reference layer) is provided other than respective recording layers, and tracking is carried out by using a beam other than a beam used for recording and reproducing. In the following, this is referred to as groove-less multilayer system.

Also, an investigation is carried out on an optical disc which does not have a recording layer that is physically defined as in a multilayered optical disc of a background art and a recording technology thereof. As an example, according to a technology described in Japanese Unexamined Patent Application Publication No. 2008-97723, a recording region consisting of a photorefractive material is recorded with a microhologram, that is, small interference fringes. There is not a structure of physically specifying a recording position in the recording region described above, and therefore, recording positions of respective microholograms are determined by indirectly controlling a focal point position of light (recording light) used for recording. Taking another example, recording is carried out by forming a void in a recording region as described in Japanese Unexamined Patent Application Publication No. 2009-238285. According to the recording methods, a virtual recording layer can be increased comparatively freely, and an increase in a recording capacity per one sheet of disc is easy to be achieved. Incidentally, in the present specification, the system which does not a have a layer that physically specifies a recording position in a recording region as described above is generally referred to as spatial recording for convenience of explanation. Even in this system, a reference layer is used for tracking.

SUMMARY OF THE INVENTION

There is no physical structure which can detect a track error signal from at a recording layer or a recording position for recording in either of the groove-less multilayer system and the spatial recording system as has been explained in the section of BACKGROUND OF THE INVENTION. Therefore, it is necessary to carry out tracking at least in recording by using a reference layer. However, a problem occurs that a radius of an optical spot for recording and reproducing impinged on a recording face is changed by a change in a radial tilt (a disc radius direction component of an inclination of an optical axis of an objective lens from a vertical line of a disc face) as described in Japanese Journal of Applied Physics 48 (2009) 03A054.

FIG. 2 is a schematic view for explaining the problem described above and a sectional view in a radius direction of a recording medium in a case of spatial recording. The recording medium consists of a transparent and rigid substrate 23 and a recording region 25 configured by a recording material. A face of the substrate on aside in contact with the recording region configures a reference layer and is formed with a groove for tracking. Particularly, such a reference layer is referred to as a grooved reference layer 24. However, in the following, the layer is referred to simply as a reference layer in a range which does not causes confusion in view of the context. A pitch of the groove is 0.64 µm. A main beam 21 is light used for recording and reproducing and is blue color laser light having a wavelength of 405 nm. A guide beam 20 used for positioning the main beam is red color laser light having a wavelength of 650 nm. The main beam and the guide beam share an objective lens 3. NA of the objective lens for blue color laser light is 0.85. Therefore, the main beam is moved along a shape of the groove by tracking the groove provided at the grooved reference layer by using the guide beam.

A track 26 in FIG. 2 is recorded in a state of tracking the groove (which is recessed in view from an incident side) in a state where optical axes of the main beam and the guide beam are vertical to the reference layer. Therefore, the respective tracks are aligned to be recorded directly below the grooves of the reference layer. In view of a section in a radius direction of the disc, as illustrated in FIG. 2, the track consisting of a recording mark row seems to configure a virtual recording layer. Hereinafter, such a virtual recording layer is also referred to simply as a recording layer in a case where it is not necessary to particularly differentiatedly define the virtual recording layer.

In FIG. 2, the guide beam tracks the groove of the reference layer. Here, when a radial tilt is brought about at the optical axis relative to the reference layer for some reason, as shown in FIG. 2, an offset d is produced at a position of irradiating the recording layer with the spot of the main beam 21 relative to a recorded track. The offset d depends on a magnitude of the radial tilt, and a distance from the reference layer to a focal point position of the main beam. Assuming that the magnitude of the tilt is sufficiently small, a magnitude of d is approximately given by Equation (1).

Equation 1

$$d = \frac{nL}{n'}\sin\theta \quad (1)$$

Here, notation θ designates a tilt angle, notation L designates a distance from a reference layer to a focal point position of a main beam, notation n designates a refractive index of air, and notation n' designates a refractive index of a recording region, respectively.

Assuming a case where the tilt is 0.1 degrees, L is 100 μm, and n'=1.6, the offset reaches about 0.11 μm. This is a size as large as approximately ⅙ of a track pitch. In a case where such a large tracking offset is brought about, even when the groove of the reference layer is tracked by the guide beam, it is difficult to reproduce the recorded track. Also, in a case of successive recording or postscript which carries out recording successive to a layer in which recording is carried out up to a midway, when such an offset is brought about, there poses a problem that not only a discontinuous deviation is brought about to the track at a postscript start position, but in a case where the size of the offset is significant, recording is carried out on a track that has been already recorded, and there is even a danger of destructing the disc.

With regard to an offset that is brought about in reproducing, as described in Japanese Journal of Applied Physics 48 (2009) 03A054, there is a possibility of capable of avoiding the offset by detecting a track error signal from a track which has been recorded. Also, with regard to a deviation in the postscript start position, it seems that the skilled person can analogize that the offset from the recorded track may be corrected before starting the postscript by using the track error signal detected from the recorded track. However, actually, the way of thinking cannot generally be applied. Because in a system of detecting a track error signal (push-pull signal) by using the consecutive grooves, a region where an effective track error signal cannot be detected is necessarily present.

FIG. 3 explains a relationship between a groove and a track error signal (push-pull signal) which is detected by using the groove, showing a schematic diagram of a section of the groove on an upper side and showing the track error signal in correspondence therewith on a lower side. Here, a ratio of a width of the groove to a width of a land is made to be 1:1. When a pitch of the groove is designated by notation P, also the track error signal becomes a signal in a sine wave shape having a period of P. Incidentally, the skilled person naturally knows a method of detecting the push-pull signal, and therefore, here, an explanation thereof is omitted. It can easily be understood that a zero-cross point of the track error signal corresponds to a center of the groove. In a track error signal generating system, it is defined that a gradient of the track error signal at the groove center is positive as shown in FIG. 3. Naturally, also a definition of a sign of an input signal to a controller which carries out a track control by using the signal is in accordance therewith. However, as is apparent from FIG. 3, a push-pull signal is configured by a sine wave shape, and therefore, a sign of an inclination thereof becomes negative in a region of about ½ of one period thereof. Therefore, a track control cannot be carried out in such a region (in FIG. 3, a region where a distance from the groove center is equal to or larger than P/4, and equal to or smaller than 3P/4). That is, in a case where the magnitude of the offset described above corresponds to the region, the track control cannot be carried out by compensating for the offset.

As a system of generating a tracking signal, there is a so-called sample servo-control system other than the system using the grooved disc and the push-pull signal. The sample servo-control system is described in details, in, for example, Japanese Unexamined Patent Application Publication No. Hei7 (1995)-110958, and therefore, here, a simple description will be given to the system. According to the system, as shown in FIG. 4, A-pit 27A and B-pit 27B having a depth to a degree the same as that of a depth of the groove are formed at a surface of a substrate which is a reference layer in place of the groove. Although sizes and depths of A-pit and B-pit are the same, A-pit and B-pit are respectively shifted from a center of each track by an equal distance. Also, A-pit is arranged to necessarily appear prior to B-pit. FIG. 5 is a view for explaining a structure of a reference layer 72. As shown in FIG. 5, sets of pits described above are arranged in a radius direction at a track pitch. In the following, a group of pits 71 arranged in a radius direction is referred to as a spoke 70. A sufficient number of the spokes 70 are provided in an angular direction (peripheral direction) at equal angular intervals.

The track error signal is generated by subtracting an amplitude (reproducing beam intensity change) detected by B-pit from an amplitude detected by A-pit. The track error signal provided in this way is configured by a sine wave shape of a period P invariably as shown at the lower portion of FIG. 4. That is, the same problem occurs as that in case of using the groove.

As described above, in a case of carrying out the track control of the main beam by detecting tracking information provided at the reference layer by the guide beam as in the groove-less multilayer system or the spatial recording system, there poses a problem by an offset produced by a change in a radial tilt. Particularly, it is a problem that there is a possibility of destructing a recorded track in case where recording is performed for a recording layer during recording. In the system of the groove or the sample-servo control system, an uncontrollable region is present, and therefore, there is a case where the track control cannot be carried out by compensating for the offset.

An optical information recording medium according to the present invention includes a reference layer which is formed with a mark pair (paired mark) having an operation of modulating a reflected light intensity and a recording layer for solving the problem described above. According to the mark pair, there is configured a spoke by a first mark pair row aligned with the mark pairs in a radius direction by a pitch of a track pitch multiplied by an integer, and one or more of other mark pair row(s) aligned with the mark pairs in the radius direction by the pitch of the track pitch multiplied by an integer. Plural pieces of the spokes are aligned in a peripheral direction of the medium.

When a number of the mark pair rows included in the spoke is equal to or more than 3, a period of arranging the mark pairs in the mark pair row is equal to a product of the number of the mark pair rows multiplied by the track pitch. When the number of the mark pair rows is equal to 2, the second mark pair row is aligned by being shifted from the first mark pair row by ½ of the track pitch in the radius direction.

An example of a medium includes 3 of a first mark pair row through a third mark pair row. At this occasion, first marks configuring respective mark pairs of the first mark pair row, the second mark pair row, and the third mark pair row are aligned by being shifted relative to the track center by ¾ of the track pitch in a radius outer peripheral direction, and second marks configuring the respective mark rows are aligned by being shifted relative to the track center by ¾ of the track pitch in the radius outer peripheral direction. A period of arranging the mark pairs in the first mark pair row, the second mark pair row, and the third mark pair row is equal to 3 times as much as the track pitch. The second mark pair row is arranged relative to the first mark pair row by being shifted in the radius direction by the track pitch, and the third mark pair row is arranged relative to the second mark pair row by being shifted in the radius direction by the track pitch.

In order to resolve the above-described problem, an optical information recording and reproducing device according to the present invention includes a light source, an optical system of converging a beam emitted from the light source to a recording layer of an optical recording medium of the present invention by an objective lens, means for detecting a track error signal from reflected light from the recording layer of the optical information recording medium, a second light source, an optical system of irradiating the reference layer of the optical information recording medium with light emitted from the second light source, means for detecting the plural track error signals from reflected light from plural mark pair rows of the reference layer, means for selecting the track error signal having a desired property from the plural track error signals, a feedback controller for a track control, and means for selecting either one of the track error signals detected by the first and the second light sources.

A recording method of the present invention is a method of recording to a recording layer at a midway of recording of the optical information recording medium according to the present invention. The recording method includes a step of carrying out a track control for a recorded track by using a main beam for recording, a step of recording a track error signal provided from the reference layer by irradiating the reference layer with a guide beam, a step of comparing the recorded track error signal with a track control drive signal of the main beam and selecting the track error signal showing a highly correlative change over time, a step of selecting the selected signal having a small average of an absolute value of an amplitude, a step of selecting a value at a recording start position of the track error signal finally selected as an offset, and a step of carrying out a track control with the offset as a target value by switching a track control signal of the main beam to the track error signal provided from the reference layer.

According to the present invention, an uncontrollable region is not present unlike a groove or a sample servo-control system of the background art. Therefore, the track control can be carried out by compensating for the offset which is produced by a change in a radial tilt. As a result thereof, successive recording can be carried out with no problem for a recording layer at a midway of recording even in a system of carrying out a track control of a main beam by detecting tracking information provided at a reference layer by a guide beam as in a groove-less multilayer system or a spatial recording system.

A problem, a configuration, and an effect other than described above will become apparent by an explanation of following embodiments.

DETAILED DESCRIPTION OF THE PREFERRED EMBODIMENTS

In the previous explanation of the sample servo-control system, a source of the track error signal from the reference layer is configured by the pit. However, a similar track error signal can be acquired even by marks whose reflectance or refractive index differ from that of surrounding of them. Therefore, in the present specification, these including the pit are simply referred to as marks. However, in the following, an explanation will be given such that the pit is used as the mark similar to the previous explanation.

Figure 1:
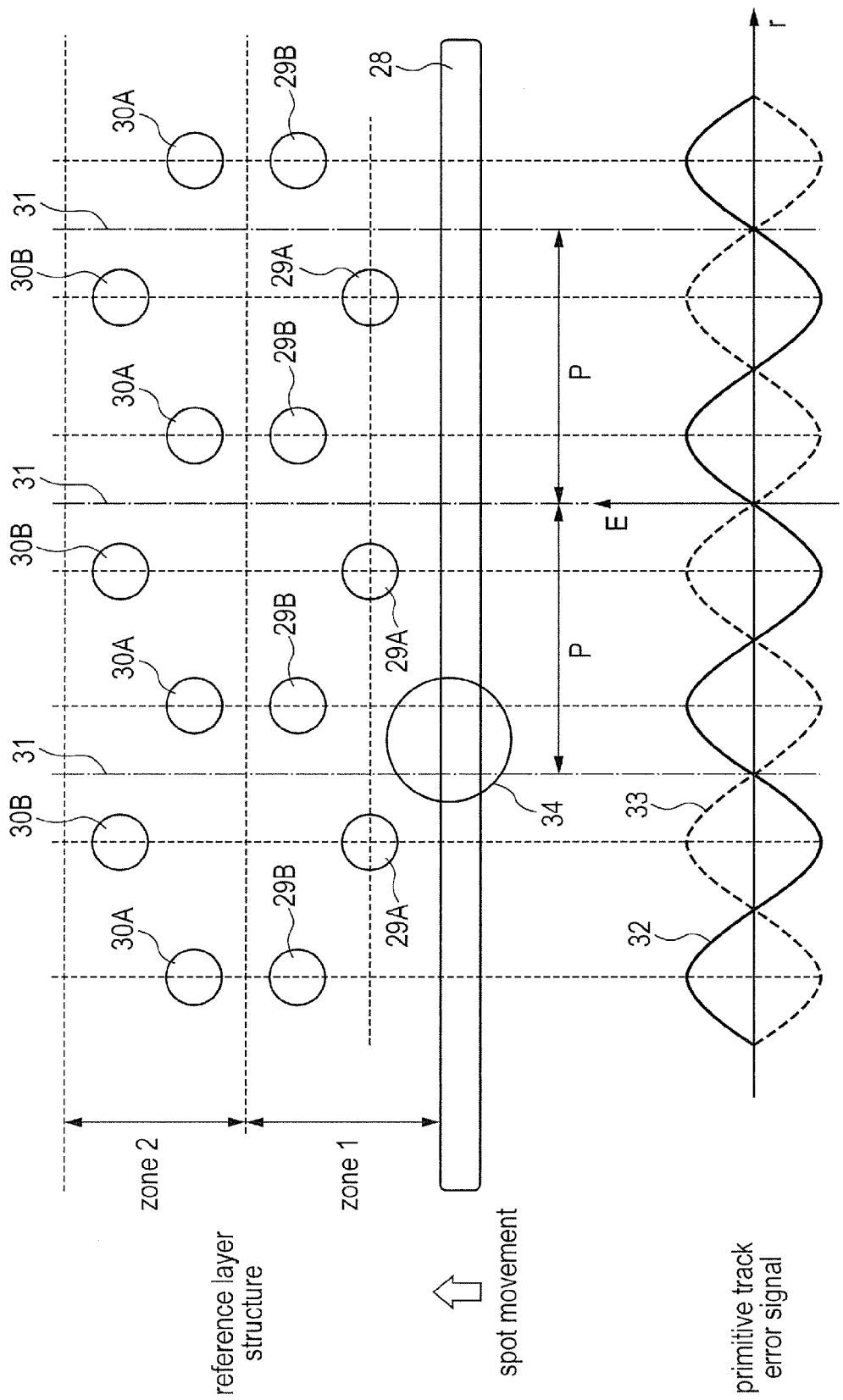
FIG. 1 is an explanatory diagram of an example of embodying the present invention.
Figure 2:
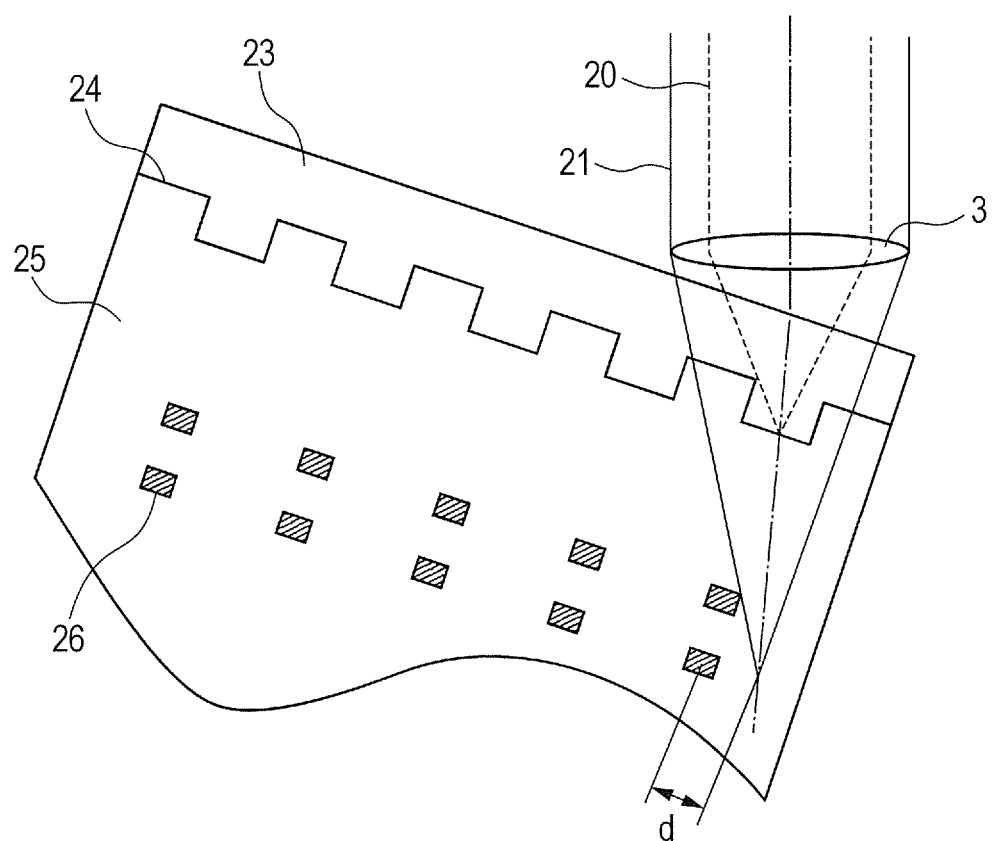
FIG. 2 is a schematic view for explaining a behavior of generating an offset by a radial tilt.
Figure 3:
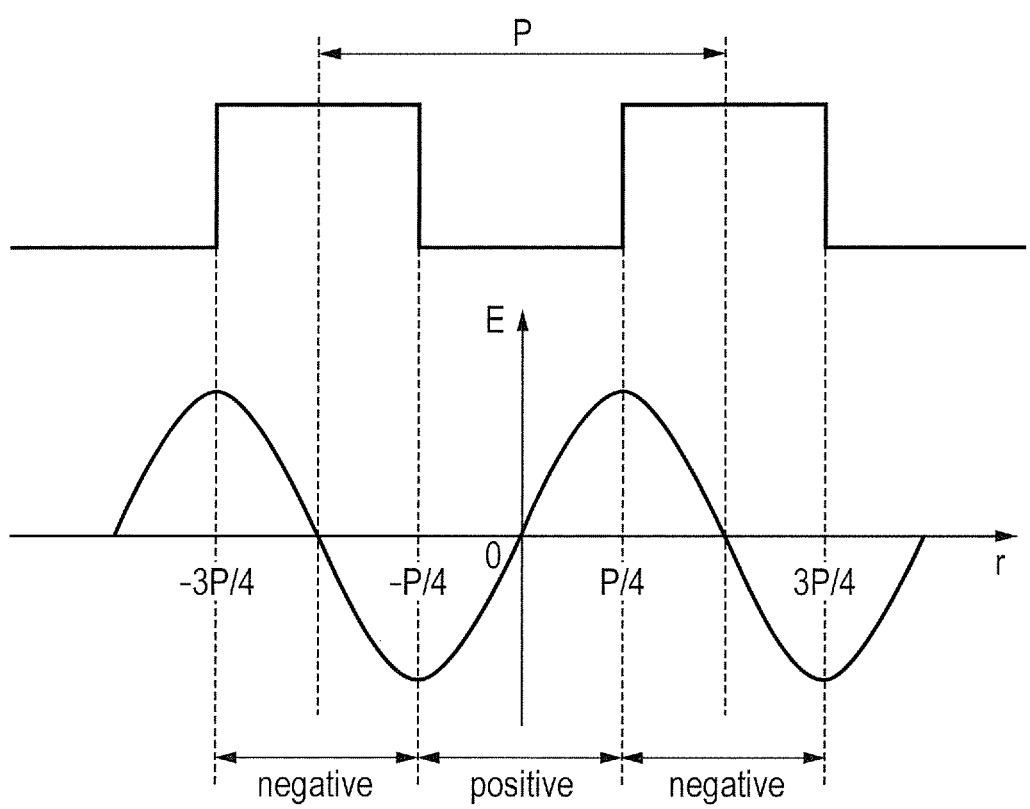
FIG. 3 is a diagram for explaining a relationship between a groove and a track error signal detected by using the same.
Figure 4:
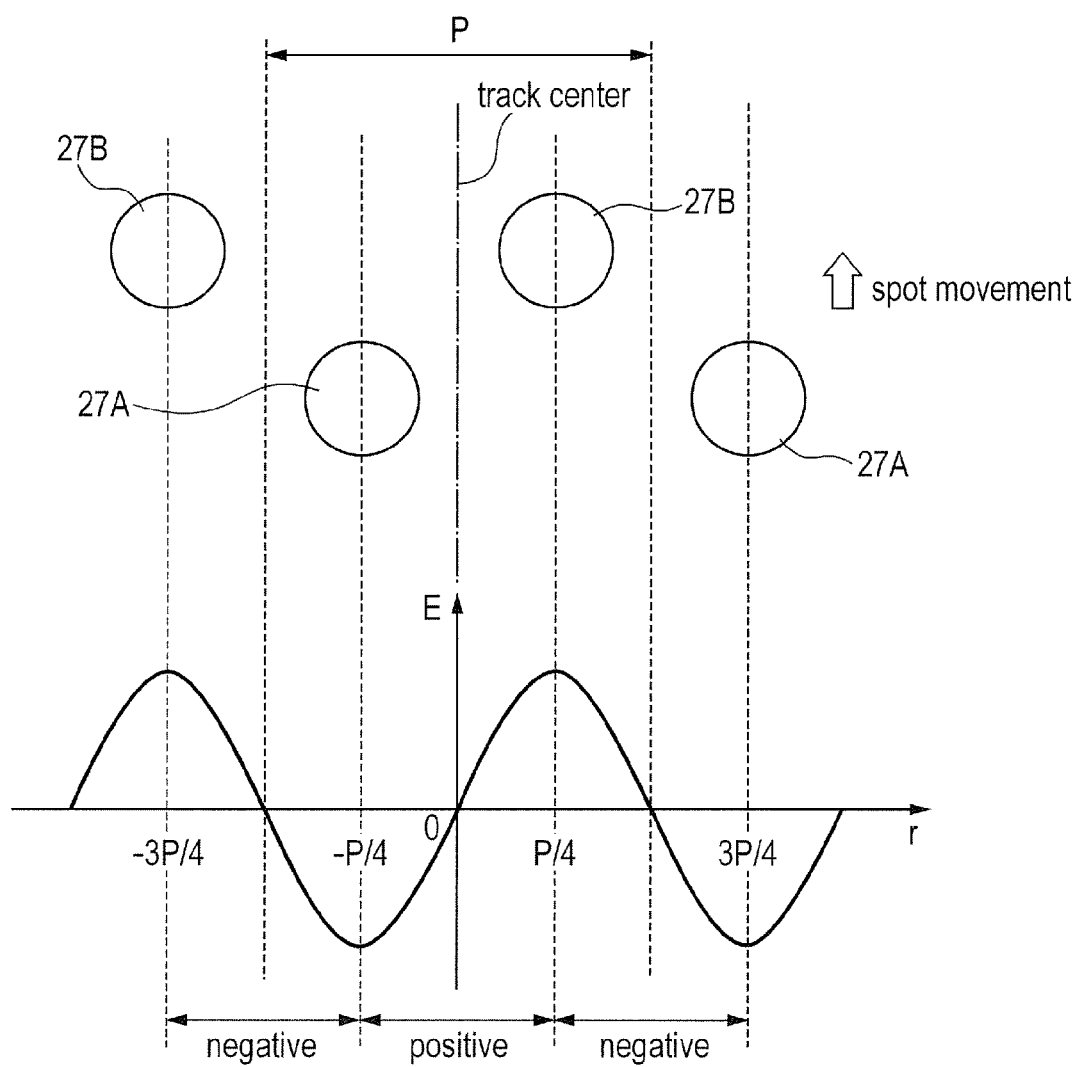
FIG. 4 is a diagram for explaining a relationship between a pit arrangement and a track error signal which is detected by a sample-servo control system.
Figure 5:
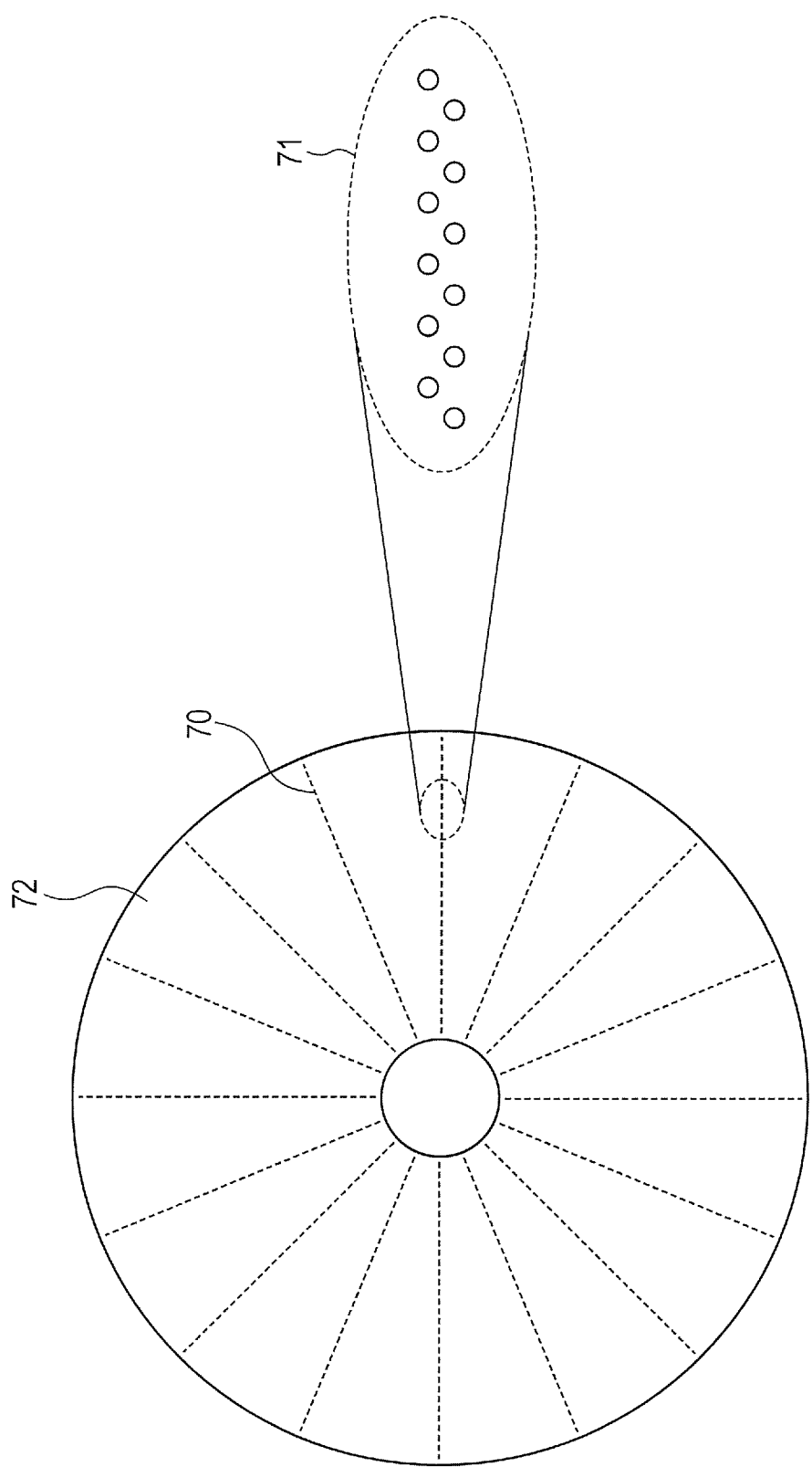
FIG. 5 is a schematic view for explaining a structure of a reference layer.

FIG. 1 shows an explanatory diagram of an example embodying the present invention. A diagram at an upper stage of FIG. 1 is a diagram for explaining a structure of a reference layer, and a diagram at a lower stage of FIG. 1 is a diagram for explaining a behavior of a primitive track error signal provided from the structure. Here, the abscissa designates a radius direction of a disc. At the upper stage of FIG. 1, a guide optical spot 34 is configured to move from a lower side to an upper side.

In this example, a spoke is configured by an initial code 28 configured by a groove extended and pit rows in the radius direction. The pit row is featured that region-1 and region-2 are doubly aligned as shown in FIG. 1. Region-1 is a region contiguous to the initial code, and region-2 appears successive to region-1. Region-1 and region-2 are virtual conception introduced for facilitating the explanation and is not necessarily recognized as a clear structure.

Region-1 is formed with pit 1A 29A and a pit 1B 29B at a surface of a substrate. Although sizes and depths of pit 1A and pit 1B are the same, these are shifted from each other relative to a track center line 31 at equal distances. Also, pit 1A is arranged to necessarily appear prior to pit 1B. A set of the pits are arranged in the radius direction at a track pitch. Therefore, as is explained in the section of SUMMARY OF THE INVENTION previously, a track error signal detected by using pit 1A and pit 1B of region-1 is configured by a sine wave shape as in a track error signal 1 32 shown at a lower stage of FIG. 1.

At region-2, pit 2A 30A and pit 2B 30B are formed at the surface of the substrate. Although sizes and depths of these are the same as those of pit 1A and pit 1B, a method of aligning the same differs. That is, pit 2A and pit 2B are arranged by shifting an alignment of pit 1A and pit 1B in the radius direction by ½ of the track pitch. Therefore, the track error signal detected by a method similar to that of the case of region-1 by using pit 2A and pit 2B of region-2 becomes a track error signal 2 33 which is shifted from the track error signal 1 by the track pitch, that is, a ½ period. That is, in a region in which a gradient of the track error signal 1 is negative, a gradient of a track error signal 2 is positive. Therefore, in the region, a track control can be carried out when the track error signal 2 is used.

Figure 6:
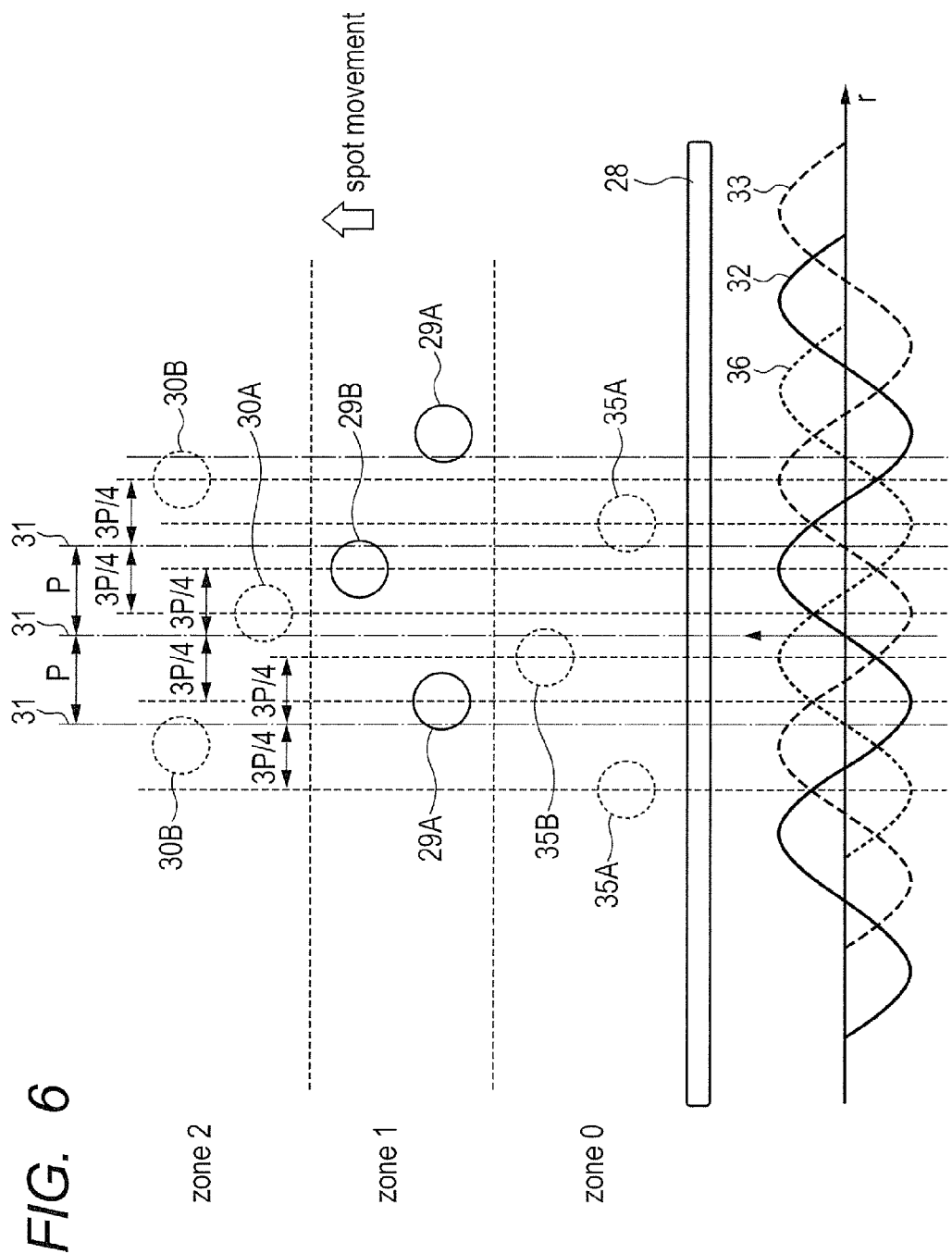
FIG. 6 is an explanatory view of other example of embodying the present invention.

In the example shown in FIG. 1, there remains a problem that a control accuracy is lowered since the gradient of the track error signal is reduced in a case where the magnitude of the offset is extremely near to P/4. FIG. 6 shows an arrangement of pits resolving the problem based on the present invention. The example is featured in using 3 sets of pits respectively arranged in 3 regions.

Region-0 contiguous to the initial code 28 is formed with pit 0A 35A and pit 0B 35B on the surface of the substrate. Although sizes and depths of pit 0A and pit 0B are the same, these are shifted from each other relative to the track center line 31 of each track by 3P/4. Pit 0A is arranged to necessarily appear prior to pit 0B. The set of pits are arranged in the radius direction at a period three times as much as the track pitch. Therefore, as is explained in the section of SUMMARY OF THE INVENTION previously, the track error signal detected by using pit 0A and pit 0B of region-0 is configured by a sine wave shape as in the track error signal 0 36 shown at the lower stage of FIG. 6.

A way of aligning pit 1A and pit 1B in region-1 is similar to that of the case of region-0 except that a track centering on an arrangement at a distance from the initial code is a track on the right side of a track of region-0. Therefore, it can easily be understood that a track error signal detected by using pit 1A and pit 1B of region-1 is configured by a sine wave shape as in the track error signal 1 32 shown at the lower stage of FIG. 6. Also, it can easily be understood that a track error signal detected by using pit 2A and pit 2B of region-2 is configured by a sine wave shape as in the track error signal 1 33 shown at the lower stage of FIG. 6.

As shown in FIG. 6, ranges in the radius direction, in which gradients of the track signals 0 through 2 are positive, overlap each other by 3P/4 by arranging the pits as described above. Therefore, it is understood that the problem described above is resolved by selecting any of the track error signals in accordance with an amount of the offset.

In the above-described example, all of intervals in the radius direction of the pits in the respective regions are equal to each other, and therefore, the track error signals provided from pits of the respective regions are configured by the sine wave shape. However, in a case in which, for example, in the example of FIG. 6, distances of pit 0A and pit 0B from the track center are slightly increased or reduced relative to (¾)P, it can be understood that there is no hindrance for selecting any of the track error signals in accordance with an amount of the offset by changing the shape of the track error signal slightly from the sine wave. In a case where a number of regions is made to be N (however, equal to or more than 3), a period of arranging pit pairs in the radius direction at each region is NP.

Figure 7:
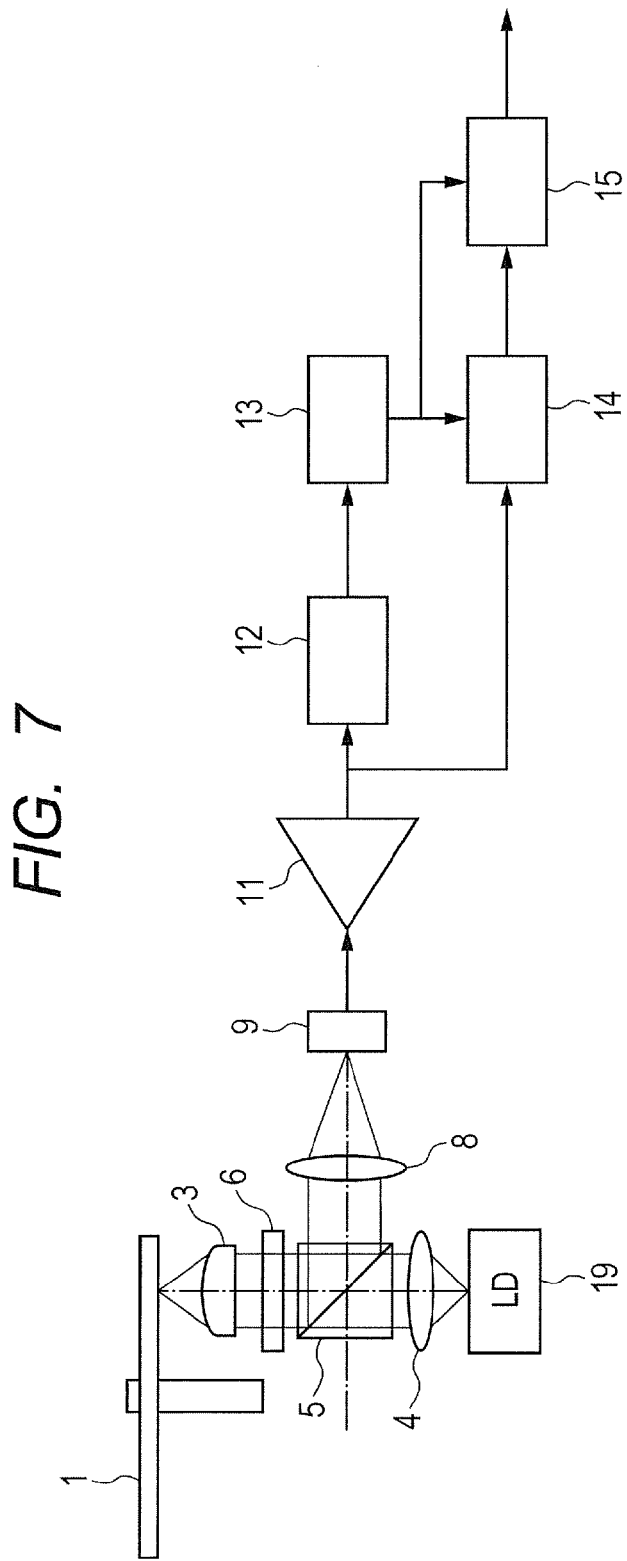
FIG. 7 is an explanatory diagram of means for generating a track error signal.

Next, an explanation for track error signal detection will be given in reference to FIG. 7 and FIG. 8. FIG. 7 shows elements and configurations which are necessary for generating a track error signal. However, for simplicity, only portions thereof related to generation of a guide beam and a track error signal are extracted and shown. A laser beam which is irradiated from a red color laser diode 19 which is a light source of a guide beam is converted into a parallel ray by a collimator lens 4, thereafter, passes through a polarizing beam splitter 5 and a quarter wavelength plate 6, thereafter, is focused onto a reference layer of an optical disc 1 by an objective lens 3. When the laser beam is reflected by the reference layer, a reflected beam intensity is modulated by an influence of a pit that is formed on a surface of the reference layer. When the guide beam reflected by the reference layer returns to the polarizing beam splitter 5 through an original path, the guide beam is reflected by the polarizing beam splitter 5, converged onto a photodiode 9 by a convergence lens 8 and is converted into a current signal. The current signal is converted into a voltage signal by a current to voltage converting amplifier 11. An output of the current to voltage converting amplifier 11 is inputted to an initial code detector 12. When the initial code detector 12 detects a specific signal pattern in correspondence with the initial code which is previously designated by analyzing a pattern of an input signal, the initial code detector 12 outputs a start pulse to a timer 13. The timer 13 generates a gate signal in accordance with a time period elapsed from the start pulse (a time point at which a pit is to appear), and outputs the gate signal to a peak detector 14. The peak detector 14 detects a peak value of an output of the current to voltage converting amplifier 11 which is supplied during a time period in which the gate is opened, and outputs the peak value to a calculator 15. The calculator 15 also receives the start pulse. When the calculator 15 receives the start pulse, the calculator 15 calculates and outputs the track error signal by using a value inputted from the peak detector 14 from the time point. A value of the track error signal is held during a time period until calculating a successive value.

Figure 8:
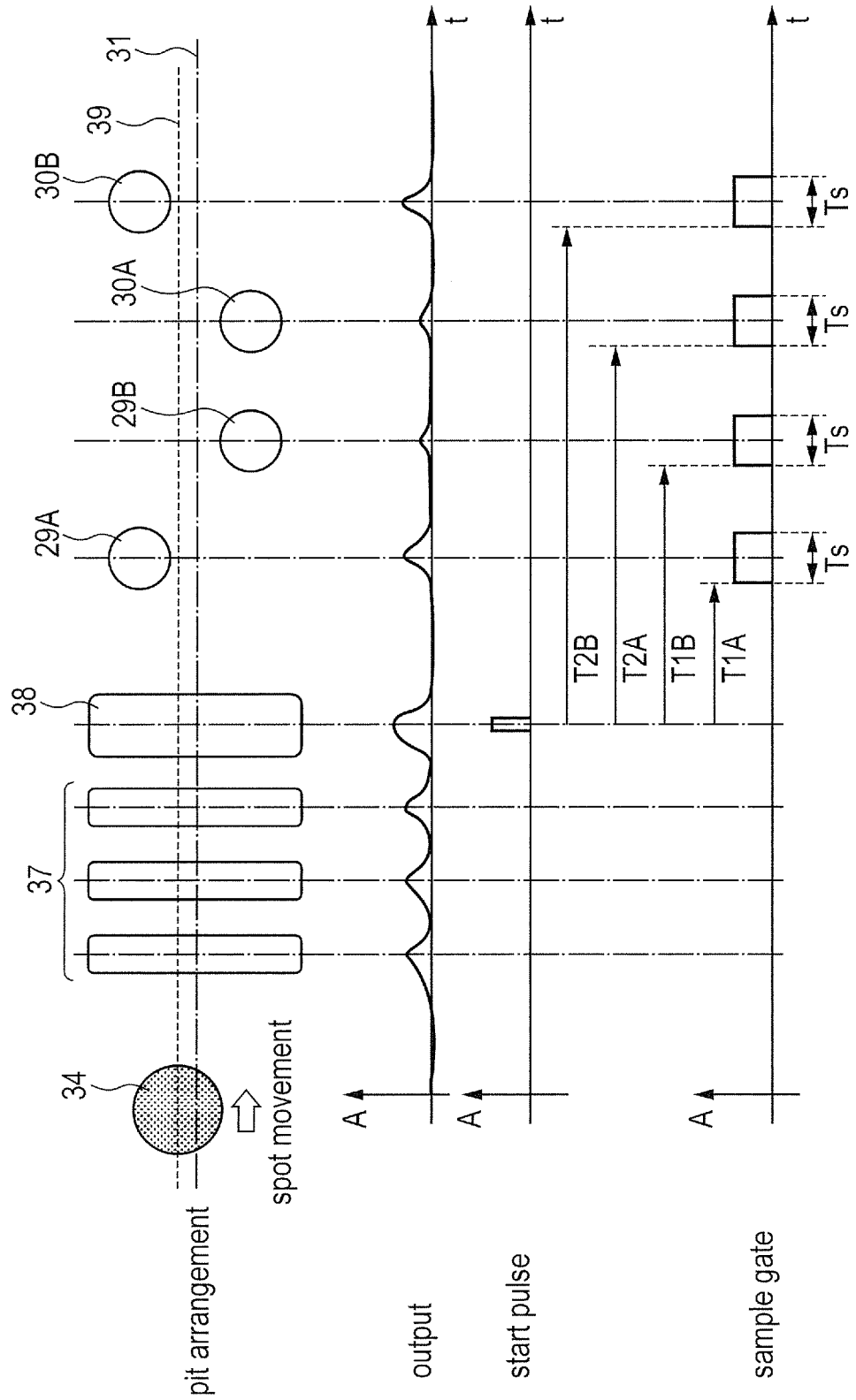
FIG. 8 is an explanatory diagram of a procedure of generating the track error signal.

FIG. 8 schematically shows behaviors of signals related to the procedure described above. An uppermost stage thereof shows a pit aligning diagram. A diagram immediately therebelow corresponds to a change in a reflected light intensity of a guide beam spot which is observed when the guide beam spot 34 tracks a guide beam spot track 39, that is, an output of the current to voltage converting amplifier 11. As has been explained above, the guide beam spot 34 first passes through the initial code. In FIG. 1, the initial code is simplified to be drawn for simplicity. Actually, as shown in FIG. 8, the initial code is configured by an identification code 37 for identifying the initial code and a terminator mark 38 indicating a position of finishing the identification code.

When the initial code detector 12 detects a specific signal pattern in correspondence with the initial code, the initial code detector 12 outputs the start pulse in accordance with appearance of the terminator mark 38. A behavior thereof is shown in a diagram second from a lower side. A lowermost stage diagram shows a gate signal generated by the timer 13. The peak detector 14 detects the peak value of the output of the current to voltage converting amplifier 11 which is supplied during a time period in which the gate is opened, and outputs the peak value to the calculator 15.

Next, an explanation will be given of a procedure when recording is carried out successively to the recording layer at a midway of recording in reference to FIG. 9 and FIG. 10 based on the present invention.

Figure 9:
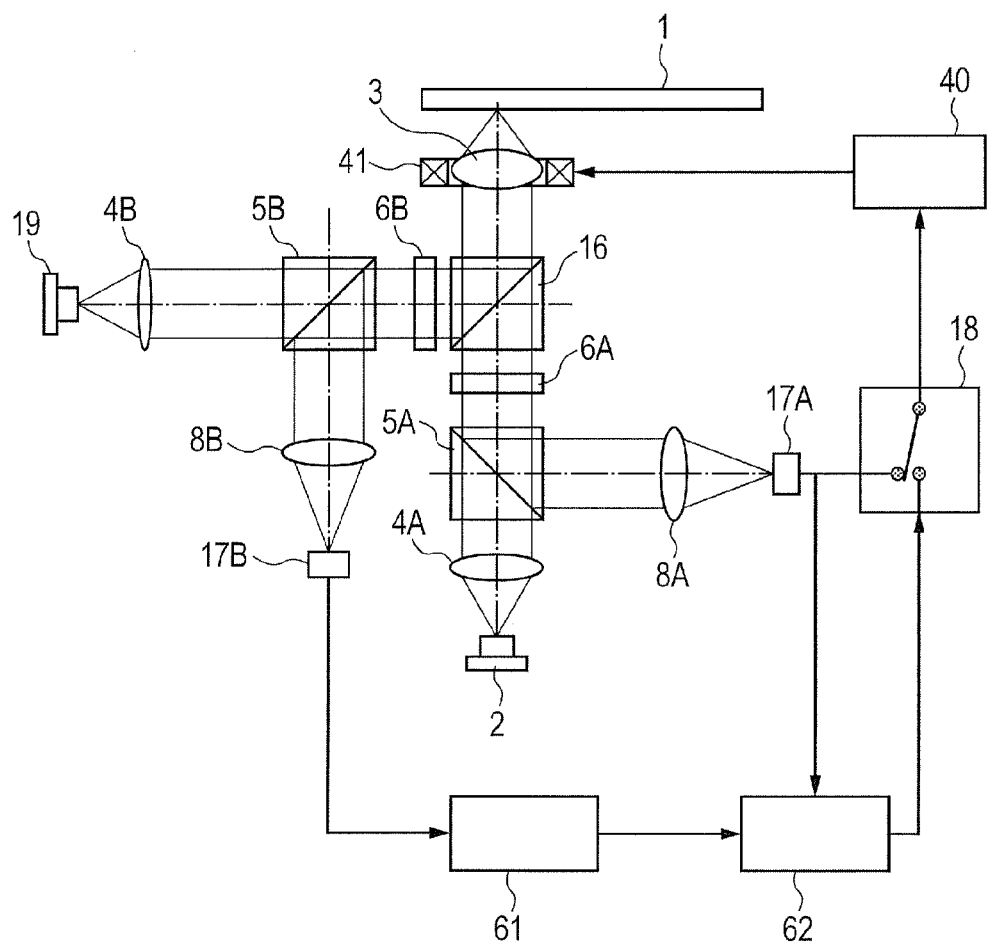
FIG. 9 is an explanatory view of an example of a device embodying the present invention.

FIG. 9 is a diagram showing a configuration example of an optical disc device based on the present invention. However, FIG. 9 is for explaining a procedure of calibrating a focal point position of a main beam before successive recording, and therefore, configurations and elements which are not necessary for the explanation are substantially omitted. One of features of the example resides in that it can be selected whether the guide beam is used or the main beam is used for detecting an error signal which is used for a feedback control of focusing and tracking.

A light source of the main beam is a blue color laser diode 2, a blue color laser beam emitted therefrom is converted into a parallel ray by a collimator lens 4A, passes through a polarizing beam splitter 5A, and is changed into a circularly polarized beam by a quarter beam plate 6A. The blue color laser beam transmits through a dichroic prism 16, thereafter, is focused onto a recording region of the optical disc 1 by the objective lens 3. Here, when a focal point of the main beam is present at a recorded recording layer, a portion of the main bean is reflected by a record mark and returns to the polarizing beam splitter 5A. During the time period, the portion of the main beam passes through the quarter wavelength plate 6A again, and therefore, a direction of polarized light differ from that of a forward path by 90°, and therefore, the portion of the main beam is reflected by the polarizing beam splitter 5A, and is converged onto a quadrant photodiode 17A by an asymmetric convergence lens 8A.

The asymmetric convergence lens 8A obtains a focus error signal by an astigmatism system in combination with the quadrant photodiode by intentionally generating an astigmatism. An asymmetric convergence lens can realize an equivalent function even in combination with a spherical lens and a circular column lens. It is well known for the skilled person that also a track error signal can be obtained from an output of the quadrant photodiode simultaneously.

A light source of a guide beam is a red color laser diode 19, a red color laser beam emitted therefrom is converted into a parallel ray by a collimator lens 4B, transmits through a polarizing beam splitter 5B, and is changed into circularly polarized light by a quarter wavelength plate 6B. The red color laser beam is reflected by the dichroic prism 16, thereafter, focused on a reference face of the optical disc 1 by the objective lens 3. A portion of the guide beam is reflected by the reference face, and returns to the polarized beam splitter 5B. During the time period, the portion of the guide beam passes through the quarter wavelength plate 6B again, and therefore, a direction of polarized light differs from that of a forward path by 90°, and therefore, the portion of the guide beam is reflected by the polarizing beam splitter 5B, and converged onto a quadrant photodiode 17B by an asymmetric convergence lens 8B. The asymmetric convergence lens 8B obtains a focus error signal by an astigmatism system in combination with the quadrant photodiode 17B by intentionally generating an astigmatism. It is apparent that a track error signal is obtained from a pit on the reference layer by the method described above. That is, a track error signal calculator 61 in FIG. 9 corresponds to a calculating portion of FIG. 7. Incidentally, it is not decided at which region of a pit is used for calculating the track error signal at the time point. The obtained track error signal is transmitted to a track error signal recording selecting portion 62, where it is decided at which region of a pit is used to calculate the track error signal. A description will be given of the method as follows.

A selector 18 selects either of error signals which are detected by using the main beam and the guide beam as necessary, and transmits the selected error signal to a track controller 40. The track controller 40 carries out a feedback control of focusing and tracking of the lens by driving an actuator 41 by using the inputted error signal.

Figure 10:
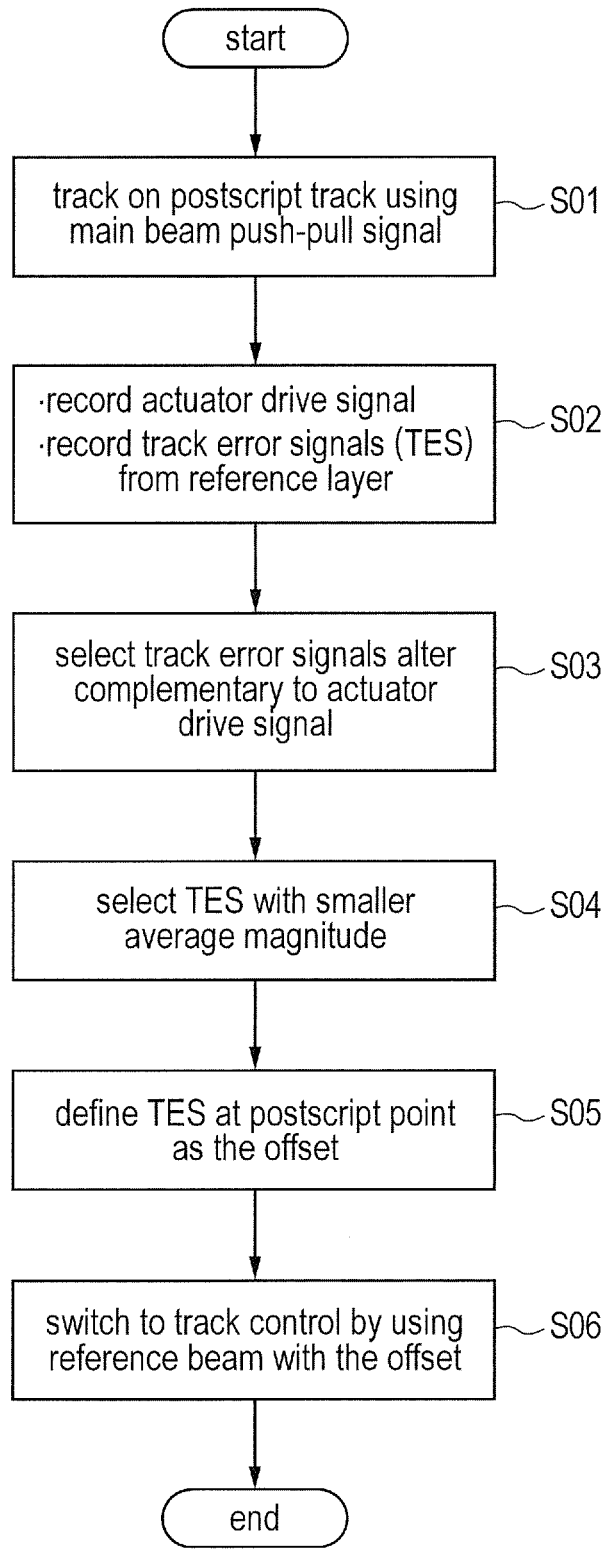
FIG. 10 is a diagram for explaining a procedure of recording.

In successive recording or postscript, as shown in FIG. 10, first, a seek to the track including a point at which postscript is carried out or to an extreme vicinity thereof is carried out. At that occasion, the selector 18 is switched to a main beam side, and a track control is carried out for a recorded track by using the main beam (S01). Next, in the state, a track control drive signal of the actuator and track error signals provided from the reference layer (all track signals; three types in the example of FIG. 6) are transmitted to the track error signal selector 62 to record these signals (S02). The recorded track error signal is compared with the track control drive signal of the actuator, and the track error signal showing a change over time which is highly correlated with the track control drive signal of the actuator is selected. At this occasion, it is permitted to leave plural candidates (S03). The track error signal having a small average of an absolute value of an amplitude is selected from the track error signals which are selected by a procedure immediately therebefore (S04). Next, a value at the postscript start position of the track error signal which is finally selected to determine is selected as an offset (S05). An input to a track controller is switched to the track error signal obtained from the reference layer, at that occasion, a value provided at step S04 as the offset is used, and is started to be recorded to the recording layer (S06).

Figure 11:
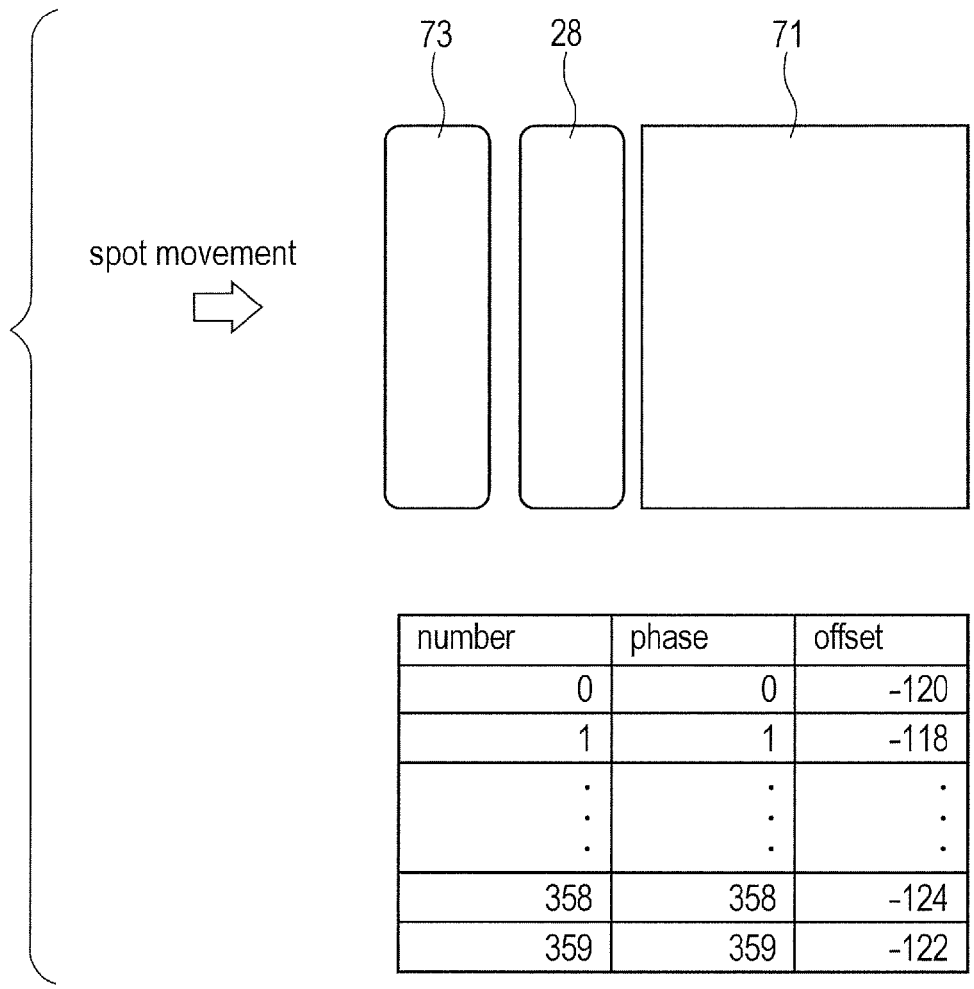
FIG. 11 is a diagram for explaining a method of dealing with a case where an offset is not constant in a periphery of a disc.

A change in tilt which is produced by disc deformation due to temperature change does not necessarily occur uniformly in a periphery of a disc. As a method of dealing with the problem, there is a method of changing the offset depending on the location of the disc. For that purpose, it is necessary to define an absolute coordinate of an angle of a spoke, and evaluate an amount of an offset which is to be used for generating a track error signal for each spoke to form a table. For that purpose, as shown in a table on a lower stage of FIG. 11, it is necessary to allocate an angular coordinate for each spoke, and arrange an angular code 73 which records an identification code thereof before the initial code.

Figure 12:
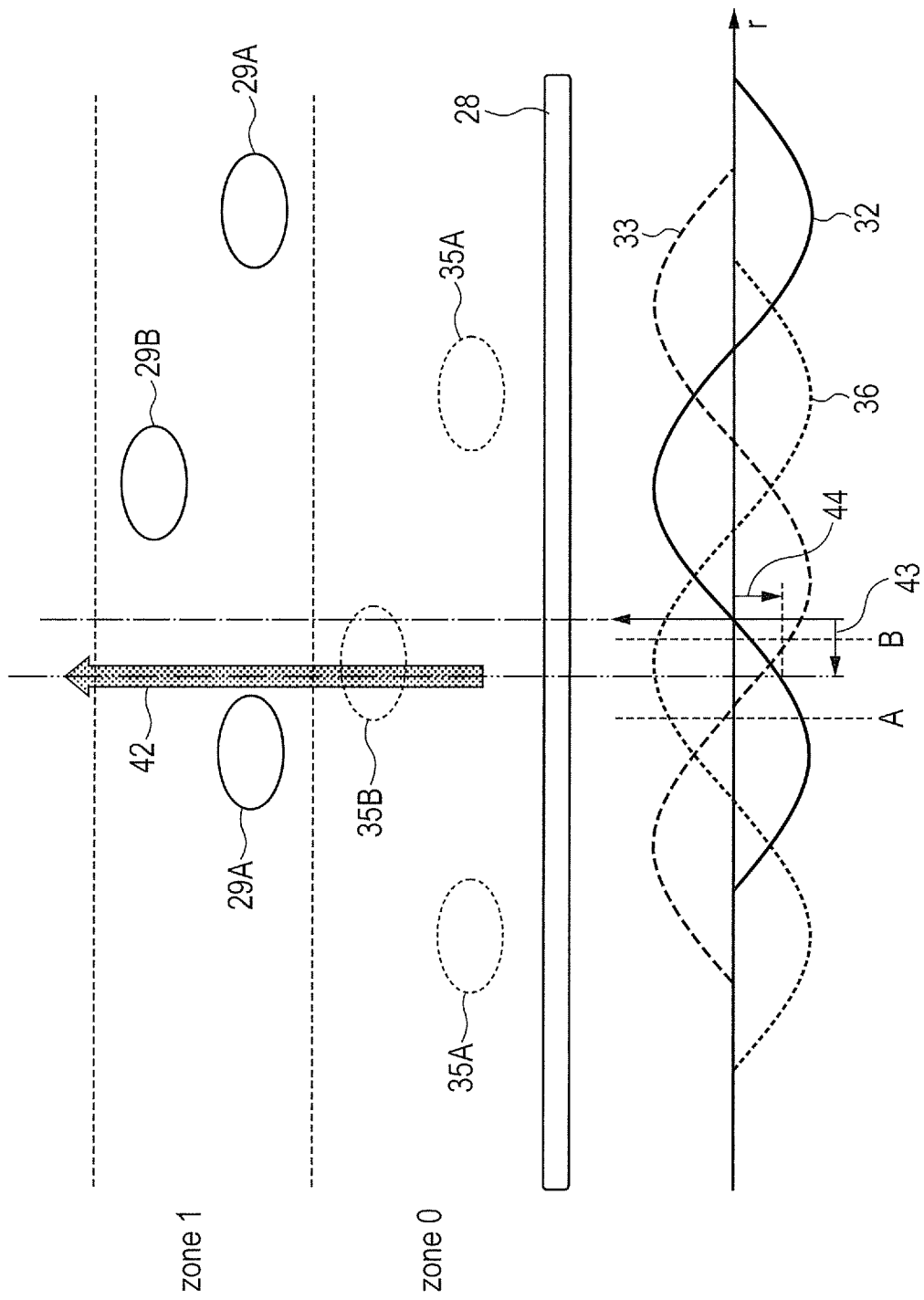
FIG. 12 is a diagram for explaining a way of calculating an offset in recording.

In successive recording, as described above, first, a seek to the track including a point at which recording is carried out or to an extreme vicinity thereof is carried out. At that occasion, the track control is carried out for the recorded track by using the main beam by switching the selector 18 to a side of the main beam. Next, the track error signals (3 kinds in the example of FIG. 6) from all the regions provided from the reference layer is transmitted to the track error signal memory and selector 62 under the state, and the track error signals are recorded. FIG. 12 illustrates an example of a locus 42 of the guide beam under the above-described condition by enlarging a portion of FIG. 6. An upper side diagram of FIG. 12 shows an extremely small portion of an orbital movement of a disc. Therefore, when the position of locus of the guide beam is shown in a lower graph, the position is expressed only as one point. However, although in conceiving a situation when the disc is orbitally moved, an influence of an eccentricity of a disc is resolved by tracking the recorded track, the recorded track has a small strain or a small eccentricity between the recorded track and the reference layer. Therefore, the guide beam proceeds while being varied slightly in the radius direction. The innermost side radius which the guide beam reaches by the variation is designated by notation A, and the outermost side is designated by notation B.

A squared sum of an amount of orbital movement is calculated from the recorded track error signal, and the track error signal having the least squared sum is selected. This is a selection of a region where a track error signal amplitude is small on an average, that is, an area which is pertinent for detecting the track error signal. However, in a case where the difference is small, it is permitted to leave plural candidates. A difference between the track error signal 1 32 and the track error signal 2 33 is small whereas it is self-evident to remove the track error signal 0 36 in the example of FIG. 12. Therefore, at this stage, track error signals 1 and 2 are left as candidates.

Successively, a pertinent amount of displacement is applied to tracking of the main beam. In accordance therewith, also the guide beam is displaced in the radius direction over the reference layer. Gradients of respective curves in a case where the radius is made to be a variable are determined by investigating changes in the track error signal 1 and the track error signal 2 at that occasion. In a current case, a sign of a gradient of an error signal used for tracking is determined to be positive. Therefore, in the example of FIG. 12, the track error signal 1 32 is selected. When FIG. 12 illustrates a spoke which is present at a vicinity of the postscript start point, the guide beam locus 42 becomes an offset 43 from a zero-cross point of the track error signal.

When the postscript is started, the track control is carried out by switching the selector 18 to the guide beam side, and configuring a target value by a postscript offset 44 shown in FIG. 12. The postscript offset 44 is a track error signal amplitude which is generated when the postscript offset 43 is brought about. Therefore, thereby a radius position of the main beam can be determined in a state of generating the necessary offset 43 (radius indicated by a two-dotted chain line in FIG. 12) by using the track error signal detected at the reference layer.

The offset is not necessarily constant over all of the orbital movement of the disc. In such a case, the postscript offsets described above are calculated with regard to all of spokes, and a feed forward control is carried out by using the values of these.

Figure 13:
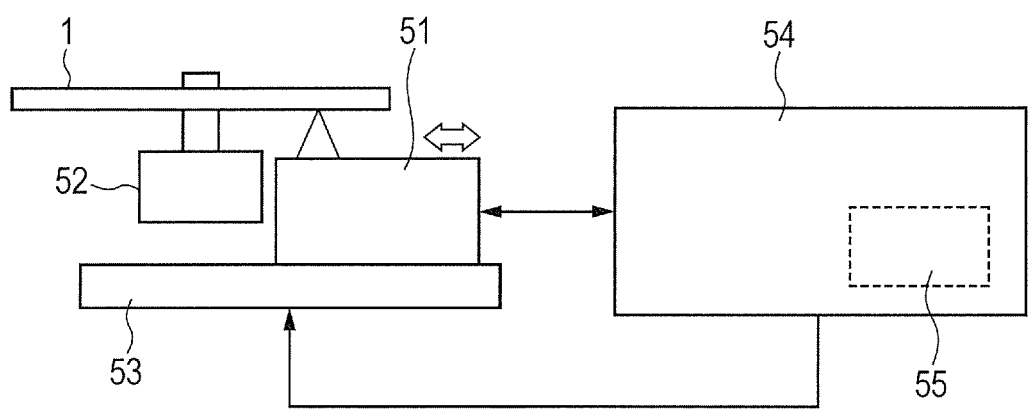
FIG. 13 is an explanatory view of an example of a device embodying the present invention.

FIG. 13 shows an example of a configuration of an optical disc device. The optical disc 1 is rotated by a spindle motor 52. A pickup 51 is configured by, for example, a light source used for recording and reproducing, an optical system starting from the objective lens and the like shown in FIG. 9. The pickup 51 carries out seeking by a slider 53. Seeking and rotation of the spindle motor are carried out by an instruction from a main circuit 54. The main circuit is mounted with an exclusive circuit of a signal processing circuit, a feedback controller or the like, a microprocessor, a memory or the like. A firmware 55 controls an operation of a total of the optical disc device. The firmware is mounted in a memory of the main circuit. Also an adjustment of the offset of the main beam in postscript described above is carried out in accordance with an instruction of the firmware.

Incidentally, the present invention is not limited to the above-described embodiments but includes various modified examples. For example, the above-described embodiments explain details in order to explain to easily understand the present invention, and are not necessarily limited to an embodiment including all of the configurations explained. A portion of a configuration of a certain embodiment can be replaced by a configuration of other embodiment, and the configuration of the other embodiment can be added to the configuration of the certain embodiment. With regard to portions of configurations of respective embodiments, addition, deletion, or replacement of other configuration can be carried out.

What is claimed is:

1. An optical information of the recording medium having a reference layer formed with a mark pair having an operation of modulating an intensity of reflected light,
wherein a spoke is configured by a first mark pair row aligned with the mark pairs in a radius direction by a pitch of a track pitch multiplied by an integer, and one or more of other mark pair row(s) each aligned with the mark pairs in the radius direction by the pitch of the track pitch multiplied by an integer,
wherein a plurality of pieces of the spokes are aligned in a peripheral direction,
wherein a number of the mark pair rows included in the spoke is equal to or more than 3, and
wherein a period of arranging the mark pairs in the mark pair row is equal to a product of the number of the mark pair rows multiplied by the track pitch.

2. An optical information recording medium having a reference layer formed with a mark pair having an operation of modulating an intensity of reflected light,
wherein a spoke is configured by a first mark pair row aligned with the mark pairs in a radius direction by a pitch of a track pitch multiplied by an integer, and one or more of other mark pair row(s) each aligned with the mark pairs in the radius direction by the pitch of the track pitch multiplied by an integer,
wherein a plurality of pieces of the spokes are aligned in a peripheral direction,
wherein the other mark pair rows are a second mark pair row and a third mark pair row,
wherein first marks configuring respective mark pairs of the first mark pair row, the second mark pair row, and the third mark pair row are aligned in a radius outer peripheral direction by being shifted by ¾ of the track pitch relative to a track center and second marks configuring the respective mark pairs are aligned in the radius outer peripheral direction by being shifted by ¾ of the track pitch relative to the track center,
wherein a period of arranging the mark pairs in the first mark pair row, the second mark pair row, and the third mark pair row is equal to the track pitch multiplied by 3, and
wherein the second mark pair row is arranged in the radius direction by being shifted from the first mark pair row by the track pitch, and the third mark pair row is arranged in the radius direction by being shifted from the second mark pair row by the track pitch.

3. The optical information recording medium according to claim 1, wherein the spoke is added with the mark row of identifying an angular coordinate.

4. An optical information recording and reproducing device comprising:
a light source;
a converging optical system to converge a beam emitted from the light source to a recording layer of an optical information recording medium including a reference layer and the recording layer formed with mark pairs having an operation of modulating an intensity of reflected light, in which a spoke is configured by a first mark pair row aligned with the mark pairs in a radius direction by a pitch of a track pitch multiplied by an integer, and one or more of other mark pair row(s) aligned with the mark pairs in the radius direction by the pitch of the track pitch multiplied by an integer and a plurality of pieces of the spokes are aligned in a peripheral direction by an objective lens;
a detector to detect a track error signal from reflected light from the recording layer of the optical information recording medium;
a second light source;
an optical system to irradiate the reference layer of the optical information recording medium with light emitted from the second light source;
a detector to detect a plurality of the track error signals from reflected light from the plurality of mark pair rows of the reference layer;
a selector to select the track error signal having a desired property from the plurality of track error signals;
a feedback controller for a track control; and
a selector to select either of the track error signals detected by the first and the second light sources.

5. A recording method of recording to a recording layer at a midway of recording of an optical information recording medium of a spatial recording type including a reference layer and the recording layer formed with mark pairs having an operation of modulating an intensity of reflected light, in which a spoke is configured by a first mark pair row aligned with the mark pairs in a radius direction by a pitch of a track pitch multiplied by an integer, and one or more of other mark pair row(s) aligned with the mark pairs in the radius direction by the pitch of the track pitch multiplied by an integer, and a plurality of pieces of the spokes are aligned in a peripheral direction, the recording method comprising:

carrying out a track control for a recorded track by using a main beam for recording;
recording a track error signal provided from the reference layer by irradiating the reference layer with a guide beam;
comparing the recorded track error signal with a track control drive signal of the main beam and selecting the track error signal having a highly correlated change over time;
selecting the track error signal having a small average of an absolute value of an amplitude from the selected track error signal;
selecting a value of the finally selected track error signal at a recording start position as an offset; and
switching a track control signal of the main beam to the track error signal provided from the reference layer, carrying out a track control with the offset as a target value and starting the recording.

6. The optical information recording medium according to claim 2, wherein the spoke is added with the mark row of identifying an angular coordinate.

* * * * *